US010685296B2

(12) United States Patent
Du et al.

(10) Patent No.: US 10,685,296 B2
(45) Date of Patent: *Jun. 16, 2020

(54) DYNAMIC EMISSION DISCHARGE REDUCTION

(71) Applicant: International Business Machines Corporation, Armonk, NY (US)

(72) Inventors: Hui Du, Beijing (CN); Yu Du, Beijing (CN); Si Huang, Beijing (CN); Yu Jia Tang, Beijing (CN); Bao Guo Xie, Beijing (CN); Wen Jun Yin, Beijing (CN); Meng Zhang, Beijing (CN); Xin Zhang, Lafayette, CO (US); Shuai Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 145 days.

This patent is subject to a terminal disclaimer.

(21) Appl. No.: 15/808,666

(22) Filed: Nov. 9, 2017

(65) Prior Publication Data

US 2018/0210470 A1      Jul. 26, 2018

Related U.S. Application Data

(63) Continuation of application No. 15/416,470, filed on Jan. 26, 2017.

(51) Int. Cl.
*G06Q 10/00* (2012.01)
(52) U.S. Cl.
CPC .................................. *G06Q 10/00* (2013.01)
(58) Field of Classification Search
None
See application file for complete search history.

(56) References Cited

U.S. PATENT DOCUMENTS 5,451,787 A * 9/1995 Taylor ................... G01N 21/39
                                                     250/338.5
6,975,975 B2   12/2005 Fasca
              (Continued)

FOREIGN PATENT DOCUMENTS

EP    3 012 694 A1    4/2016
FR    2953021 A1    5/2011

OTHER PUBLICATIONS

Reid et al., "Air Quality Modeling for Policy Development", Journal of Toxicology and Environmental Health, Part A, Accepted Feb. 23, 2006, published online: Feb. 14, 2007; pp. 295-310.

(Continued)

*Primary Examiner* — Vincent H Tran
(74) *Attorney, Agent, or Firm* — Scully, Scott, Murphy & Presser, P.C.; Kevin M. Jordan, Esq.

(57) ABSTRACT

A method for establishing and using a pollutant emission scavenging forecasting (PESF) model to calculate a purgeable pollutant emission to dynamically control an emitted pollutant at any target concentration. The dynamic control considers the initial pollutant concentration and pollutant scavenging ability of atmosphere. The method further takes into account the constraint conditions specified by a user, and employs a dynamic emission correction system to quickly calculate an optimal pollutant emission scheme. If the emission is lower than minimum acceptable value for a current time instance (a moment), the method corrects the emission intensity before (prior to) this moment by changing the initial concentration at this time. This initial concentration is the final pollutant concentration of a prior moment. Since the method makes full use of the atmospheric pollutants scavenging ability, the dynamic emission control scheme can provide the most effective and lowest economic losses solution.

6 Claims, 10 Drawing Sheets

(56) References Cited

U.S. PATENT DOCUMENTS

| | | | |
|---|---|---|---|
| 7,421,348 | B2 | 9/2008 | Swanson |
| 8,560,146 | B2 | 10/2013 | Kwon et al. |
| 8,644,961 | B2 | 2/2014 | Wroblewski et al. |
| 8,768,664 | B2 | 7/2014 | Swanson |
| 2004/0090628 | A1* | 5/2004 | Ershov ............... G01N 21/031 356/438 |
| 2012/0278026 | A1* | 11/2012 | Swanson ............... G05B 17/02 702/109 |
| 2013/0179078 | A1 | 7/2013 | Griffon |
| 2015/0073572 | A1* | 3/2015 | Joshi ............... B01D 53/346 700/90 |
| 2016/0091474 | A1* | 3/2016 | Griffon ............... G01N 33/0036 702/24 |
| 2018/0210469 | A1* | 7/2018 | Du ............... G06Q 10/00 |
| 2018/0321208 | A1* | 11/2018 | Bai ............... G01N 33/0034 |

OTHER PUBLICATIONS

Lu et al., "A Two-Phase Optimization Model Based on Inexact Air Dispersion Simulation for Regional Air Quality Control", Water, Air & Soil Pollution, Accepted Nov. 19, 2009, Published Online: Jan. 15, 2010, vol. 211, Issue 1, pp. 121-134.

Vardoulakis et al., "Modelling air quality in street canyons: a review", Atmospheric Environment, vol. 37, Issue 2, accepted Oct. 11, 2002; published: Jan. 2003; pp. 155-182.

List of IBM Patents or Patent Applications Treated as Related.

Otte et al., "Linking the Eta Model with the Community Multiscale Air Quality (CMAQ) Modeling System to Build a National Ar Quality Forecasting System", NCEP Notes, Jun. 2005, pp. 367-384.

Jylha, "Relationship between the Scavenging Coefficient for Pollutants in Precipitation and the Radar Reflectivity Factor, Part I: Derivation", Journal of Applied Meteorology, vol. 38, Oct. 1999, pp. 1421-1434.

Zheng et al., "Forecasting Fine-Grained Air Quality Based on Big Data", ACM 2015, Proceedings of the 24th ACM SIGKDD International Conference on Knowledge Discovery & Data Mining, Aug. 19-23, 2018, London, United Kingdom, pp. 2267-2276.

Pistocchi, "A GIS-based Approach for Modeling the Fate and Transport of Pollutants in Europe", Environ. Sci. Technol. 2008, 42, Jan. 25, 2008, pp. 3640-3647.

Office Action dated Jun. 27, 2019, received in a related U.S. Appl. No. 15/416,470.

* cited by examiner

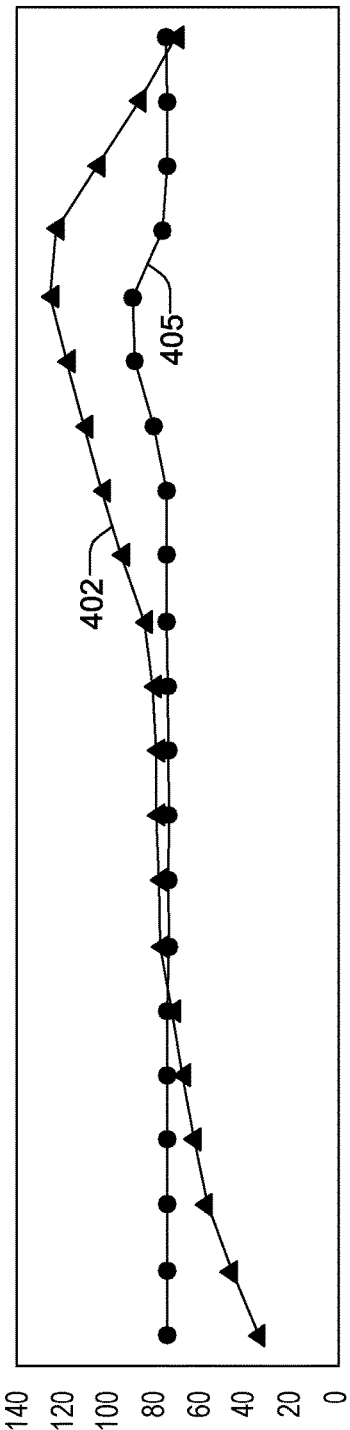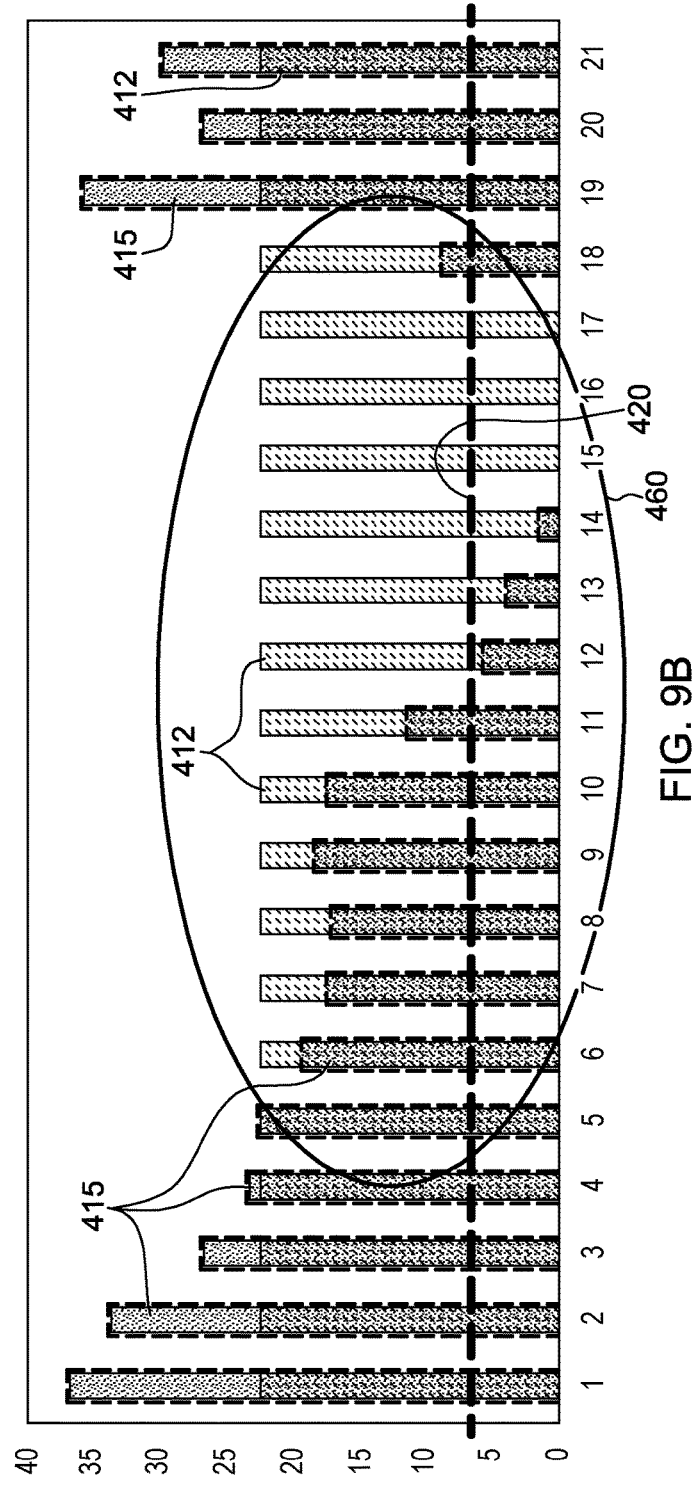
FIG. 9A
FIG. 9B

DYNAMIC EMISSION DISCHARGE REDUCTION

FIELD

Various embodiments of the present invention relate to systems and methods for avoiding pollution in an area, e.g., an urban area, and particularly, to a system and method for dynamic control of emissions discharge in an area under target pollution concentration and meteorological and chemical constraint conditions.

BACKGROUND

The impact of air pollution, e.g., in urban environments is an important issue due to both acute and chronic effects on human health. Present day urban environments are mostly dominated by traffic emissions, e.g., chemically transformed hydrocarbons such as emitted by motor vehicles. For example, main traffic-related pollutants are CO, NOx, $SO_2$; hydrocarbons, and particles. Combustion also produces a mixture of NO2 and NO. Other pollutants (emissions) include particulate matter (e.g., PM less than 2.5 microns (PM2.5) and less than 10 microns (PM10)) and volatile organic compounds (VOCs).

In an example "local" (spatial) area or region, concentration of the pollutants is influenced by transmission, diffusion and emission processes happening in the atmosphere.

SUMMARY

One embodiment of the present invention provides a computer-implemented method of dynamically controlling emission discharge of pollutants by a pollutant emitting source in a spatial area. The computer-implemented method comprises: receiving, at a processor, geographic data, atmospheric meteorological data and chemical data pertaining to the spatial area; receiving at the processor, emissions data representing pollutant substances emitted by a emitting source; generating, by the processor, based on the received meteorological and emissions data, a pollutant scavenging ability factor representing a pollutant comprehensive scavenging ability of the atmosphere; computing, at the processor, a purgeable pollutant emission value over a period of time using said scavenging ability factor; receiving, at the processor, one or more emissions constraint conditions; and dynamically controlling emissions at the emitting source based on the purgeable pollutant emission value, wherein controlled pollutant emissions of the emitting source comply with the emission constraint conditions.

Other embodiments include a computer-implemented system and a computer program product.

BRIEF DESCRIPTION OF THE SEVERAL VIEWS OF THE DRAWINGS

Through the more detailed description of some embodiments of the present invention in the accompanying drawings, the above and other objects, features and advantages of the present invention will become more apparent, wherein the same reference generally refers to the same components in the embodiments of the present invention.

FIG. 9A shows an example case study depicting a line plot of the particulate matter PM2.5 emission concentration emitted by a source of the pollutant compared with a plot of the computed PM2.5 concentration with purgeable pollutant emission $E^t$ computed at the same time instances;

FIG. 9B shows for the example case study of FIG. 9A, a bar graph plotting the example corresponding daily true emission levels emitted by the source of the pollutant compared with the purgeable pollutant emission levels $E^t$ computed at the same time instances;

DETAILED DESCRIPTION

It is to be understood that the present invention can be implemented in various manners, and thus should not be construed to be limited to the embodiments disclosed herein. On the contrary, the below-described embodiments are provided to facilitate understanding of the present invention, and convey the scope of the present invention to those skilled in the art.

As human activities discharge emissions into the atmosphere, part of the emissions can be removed by meteorological condition, e.g., such by being blown away by wind, or chemical reaction in atmosphere. This removed part is referred to herein as purgeable emissions.

By way of overview, one or more embodiments of the present invention are directed to a system, method and computer program product to identify purgeable pollutant emissions under different atmospheric conditions and to generate a dynamic short-term emission plan for a source of operating devices and equipment known to emit pollutants. For example, a short-term emission plan may have a duration ranging from 1 day (e.g., a next day) to two weeks, and may be generated for an entity such as a government of the local area, or any entity that will make a discharge cut plan based on model outputs. Further, some embodiments provide for a customized emission-reduction scheme for different demands. One end-result/goal is to increase emission-reduction efficiency, and consequently reduce economic and other losses. In some embodiments, the emission discharge/reduce/control plan of the present invention models the emission volume discharged over multiple day(s). Since the volume can be different each day, in this case, a dynamic emissions control model may update the plan daily. In one embodiment, the referred to demands may include one or more specific pollutant target concentrations (e.g., keep $PM_{2.5}$ on 75 ug/m³ or 100 ug/m³?), or other varying constraints, e.g., different customer's require different "lowest cu percentage", which will lead to different emission-reduction plans. One or more embodiments provide different emission reduction plans based on different demands for different customer goals and constraints.

Figure 2:
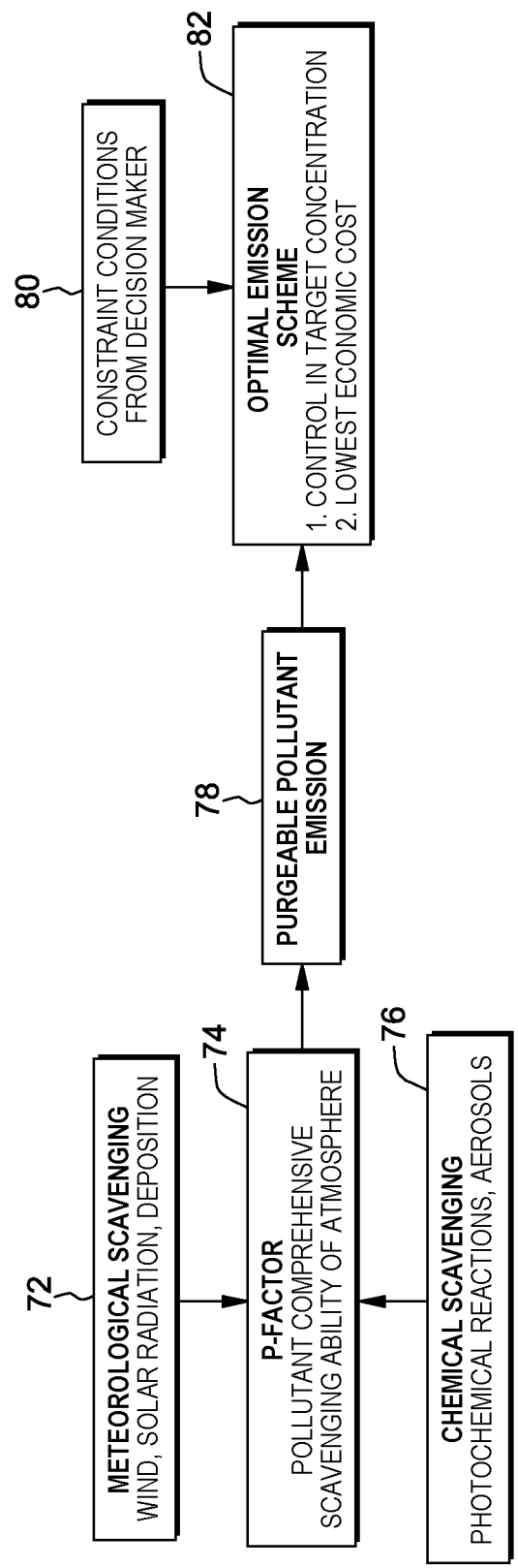
FIG. 2 shows an example of a dynamic emission discharge scheme and customized system according to one or more embodiments of the present invention.

FIG. 2 shows an example of a dynamic emission discharge scheme and customized system according to one or more embodiments of the present invention. As shown in FIG. 2, at 74, a computer system software component computes a P-factor which represents a pollutant comprehensive scavenging ability of the atmosphere. In one embodiment, the computing of the P-factor at 74 takes into account meteorological scavenging ability 72 and chemical scavenging ability 76. In one embodiment, the P-factor is computed that includes the chemical scavenging ability (e.g., photochemical reactions and aerosol condensation in atmosphere) and meteorological scavenging ability (e.g., wind, solar radiation, and deposition processes in atmosphere) thereby reflecting a pollutant comprehensive scavenging ability of the atmosphere in a target spatial area, e.g., a city. That is, the "P-factor," is a parameter that represents the pollutant comprehensive scavenging ability of atmosphere, including meteorological scavenging and chemical scavenging ability.

The computing of P-factor at 74 is computed by first by representing the pollutant concentration $C_F$ at any time in the atmosphere according to equation 1) as follows:

$$C_F = C_I + \frac{\partial C}{\partial t}\bigg|\text{emission} + \frac{\partial C}{\partial t}\bigg|\text{met} + \frac{\partial C}{\partial t}\bigg|\text{chemistry} \quad 1)$$

where $C_I$ is an initial pollutant concentration. To compute the P-factor as a pollutant comprehensive scavenging ability of the atmosphere, the meteorological scavenging ability component model is computed according to:

$$\frac{\partial C}{\partial t}\bigg|\text{met} = -\nabla_H \cdot V_H \cdot C + \left[\frac{\partial(C\eta)}{\partial t} - C\frac{\partial^2 h}{\partial z \partial t}\right] + \nabla \cdot \rho K \nabla\left(\frac{C}{\rho}\right) + \sigma C$$

$$\frac{\partial C}{\partial t}\bigg|\text{met} \sim \alpha_1 C + \beta$$

where, in the meteorological scavenging ability component of the P-factor, the $-\nabla_H \cdot V_H \cdot C$ term represents XY advection (1st derivative); the $$\left[\frac{\partial(C\eta)}{\partial t} - C\frac{\partial^2 h}{\partial z \partial t}\right]$$

term represents a Z transport (1st and 2nd derivative), the $$\nabla \cdot \rho K \nabla\left(\frac{C}{\rho}\right)$$

term represents diffusion (2nd derivative), and the σC term represents a deposition (0 derivative) with $V_H$ being the horizontal wind vector, ρ being atmospheric density, K is a turbulent exchange (diffusion) coefficient, η is the net vertical transport rate, and σ is the removal (including dry deposition and wet scavenging) rate coefficient.

Further, the chemical scavenging ability component of the P-factor is modeled according to:

$$\frac{\partial C}{\partial t}\bigg|\text{chemistry} = \alpha_2[C]$$

In the chemical scavenging ability component of the P-facto the [C] term represents a pollutant concentration in chemical reactions (0 derivative).

Under certain meteorological and chemical conditions, the P-factor pollutant concentration approximately follows a linear relationship with pollutant concentration, as shown in equation 2):

$$P(C) \approx C + \beta \quad 2)$$

where α and β are key coefficients representing that pollutant concentration relation.

Once the P-factor is computed, the value is used to determine a purgeable pollutant emission value 78 (FIG. 2). The purgeable pollutant emission value, along with any constraint conditions 80 are considered to enable calculating an optimal emission scheme 82 by the dynamic emission correction system. In some embodiments, at 82, the optimal emission scheme works to: 1) control a target concentration; and 2) at the lowest economic cost. The system makes full use of the atmospheric pollutants scavenging ability which could provide the most effective (and lowest economic cost) emission discharge scheme. In some embodiments, the optimal emission scheme 82 takes into account constraint conditions 80 from a user, such as a decision or policy maker that can impact the pollutant emission source.

Figure 3:
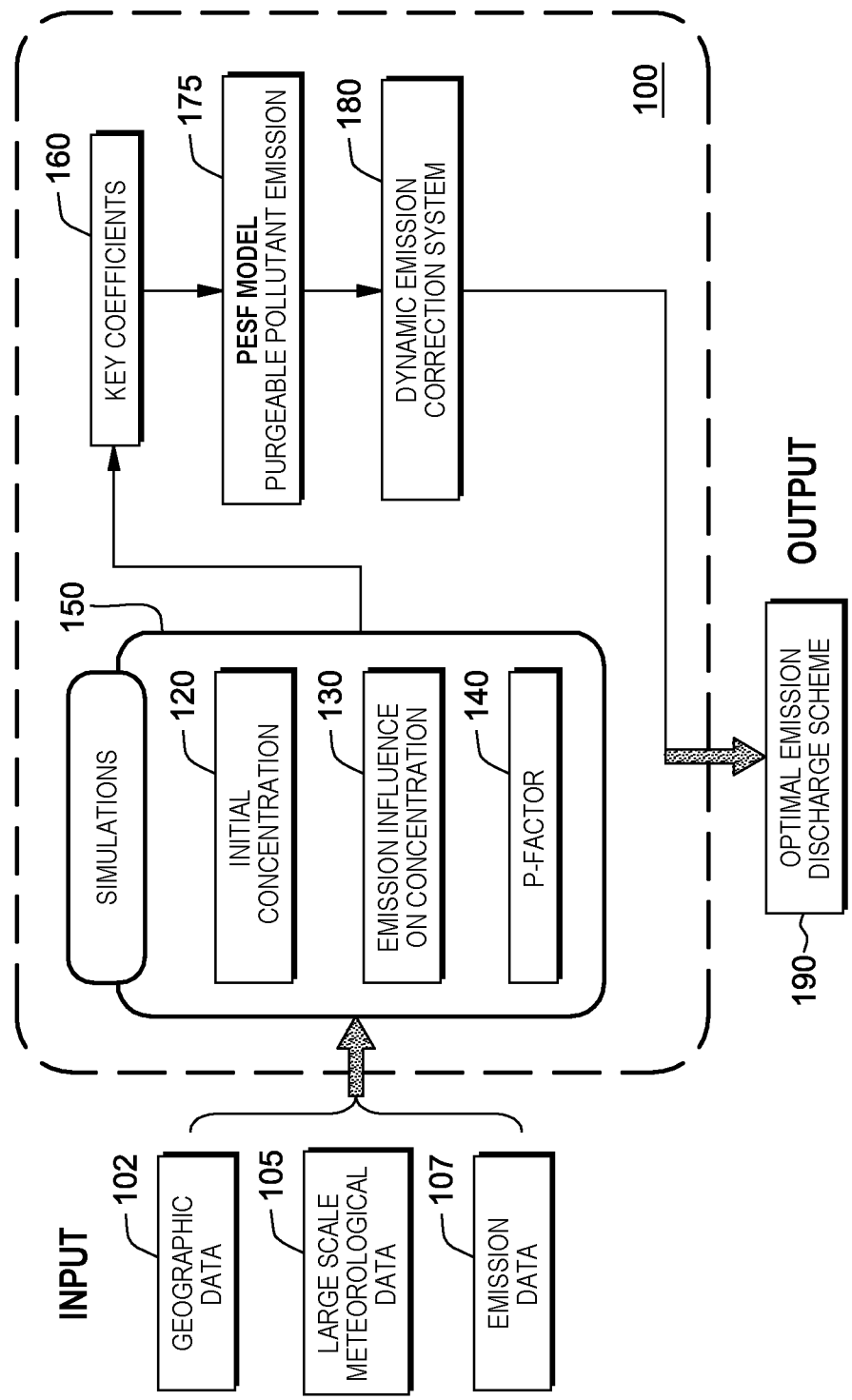
FIG. 3 shows an example method for generating an emission discharge scheme according to one or more embodiments of the present invention.

FIG. 3 shows an example method 100 for generating an emission discharge scheme according to one or more embodiments of the present invention; In FIG. 3, the method 100 includes receiving, at a computer system, various inputs including: (1) geographic data 102 e.g., that can be downloaded from a public web site (including data representing the physical and topological land formations of the area that is to be emission controlled, e.g., 2D geographical data of an area); and (2) large scale meteorological data 105, e.g., that can downloaded from a public web site which data represents conditions of the atmosphere at that area, e.g., wind, temperature, air density, pressure, relative humidity, fluid dynamics, thermodynamics, radiation, etc. The above two data types 102, 105 may be grid format data covering a global scale or areas of interest. Emission data 107 can also be input to the system 100, e.g., information about emissions in a local area, e.g., such as may be generated by an industry in a city (e.g., $SO_2$ discharge volume). Emission data for an area may by generated by various sources, such as industrial point sources, area sources, mobile sources (e.g., road and marine), and natural sources (e.g., wildfires and biogenic/geogenic). These datum 102, 105 and 107 are input to the system 100, where simulations processing 150 generates key coefficients 160 ($\alpha$ and $\beta$). An exemplary generation of coefficients $\alpha$ and $\beta$ will be described in more detail with reference to FIG. 4. Simulations processing 150 includes: defining an initial pollutant concentration 120; determining an emission influence on concentration 130 (e.g., a concentration change in the atmosphere caused by emission); computing the P-factor 140; leading to the determination of the coefficients 160 ($\alpha$ and $\beta$). After computing the key P-factor coefficients, a scavenging forecast model referred to as the Pollutant Emission Scavenging Forecasting (PESF) model 175 is run to determine a purgeable pollutant emission value. From results of this scavenging forecast model, a dynamic emission correction system 180 (an example of which is described with reference to FIG. 7) is invoked to generate an optimal emission discharge scheme as a system output at 190.

Figure 4:
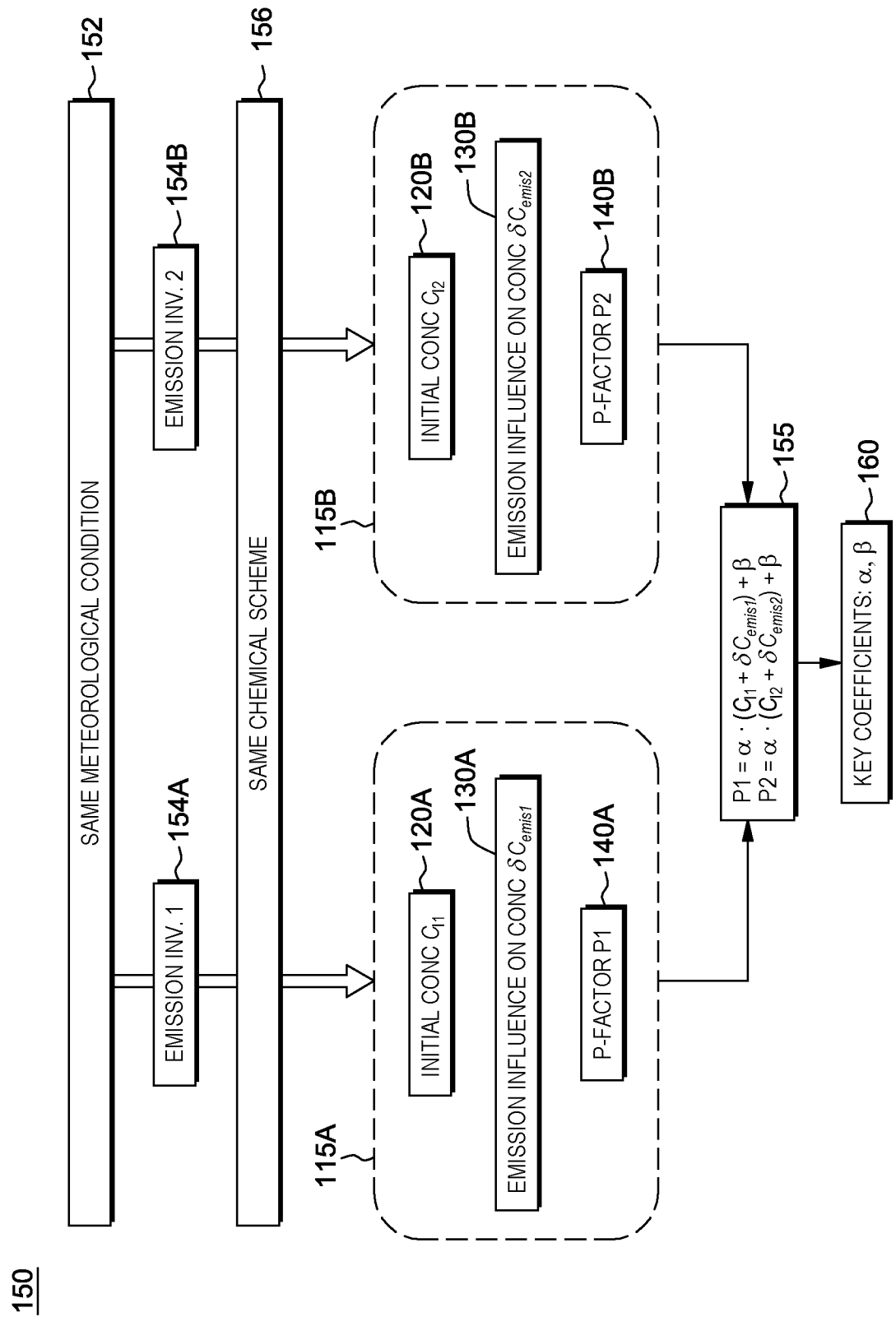
FIG. 4 shows an example method for generating coefficients based on numerical sensitive experiments in one or more embodiments of the present invention.

FIG. 4 shows an example method 150 for generating coefficients based on the simulations in one or more embodiments of the present invention. Simulations processing 150 particularly includes conducting steps of, for each emissions inventory (which is a list of emission discharge from different industries in the local area): an air pollution simulation with a numeric model, using the meteorological conditions 152, and a first emissions inventory value (which may be an original inventory, e.g., inv. 1) 154A of a first emissions intensity, and using the chemical scheme 156 (i.e., same chemical reactions in the Air Quality Numeric Model), to generate a first P-factor, P1, at a processing block 115A. In block 115A, there is determined, for an initial pollutant concentration value ($C_{I1}$) 120A, an emission influence on concentration $\delta C_{emis}$ at 130A (i.e., the pollutant concentration change cause by emission inventory input) and from that value, there is determined the P-factor (P1) indicating the pollutant concentration change caused by meteorological and chemical processes at 140A.

Given a further emission inventory, e.g., a second method may be performed in parallel, by one or more processors of a computer system, to determine a P-factor based on a second inventory value, which may be half the discharge volume of inventory 1 (e.g., inv. 2) 154B of a second emissions intensity. In the coefficient generating method, under the same the meteorological conditions 152 and same chemical conditions 156, there is further generated a second P-factor, P1, at a processing block 115B. In block 115B, there is determined, for an initial pollutant concentration value ($C_{I2}$) 120B, an emission influence on concentration $\delta_{Cemiss}$ at 130B and from that value, determine the P-factor (P2) at 140B.

Continuing to 155, FIG. 4, both generated P-factors P1 and P2 are processed at 155 according to equation 2) to generate the key coefficients. For example, a system of equations is set up for the example air quality numerical model processing of FIG. 4

$$P1 = \alpha \cdot (C_{I1} + \delta C_{emiss1}) + \beta$$

$$P2 = \alpha \cdot (C_{I2} + \delta C_{emiss2}) + \beta$$

In these system of equations, coefficients $\alpha$, $\beta$ are determinable air quality numerical model outputs, which include the concentration change from different physical and chemical processes. At any time instant, using these coefficients, the key parameters of a PESF model may be fit to determine a purgeable emissions component at any moment in time.

In one embodiment, a PESF model is generated to determine $$\left.\frac{\partial C}{\partial t}\right|$$

emission at any one or multiple time instances according to equations 1) and 2) according to equation 3) as follows:

$$\left.\frac{\partial C}{\partial t}\right|\text{emission} = C_F - C_I + P\left(C_I + \left.\frac{\partial C}{\partial t}\right|\text{emission}\right) \quad 3)$$

From equation 3), the purgeable emissions component E at any moment in time (t=i) is then computed according to equation 4) as follows:

$$E|_{t=i} = C \int\int\int\left(\int\left(\frac{C_F - \beta}{\alpha+1} - C_I\right)dt\right)dxdydz \quad 4)$$

where $C_F$ is a target pollutant concentration at any time in the atmosphere.

Figure 5:
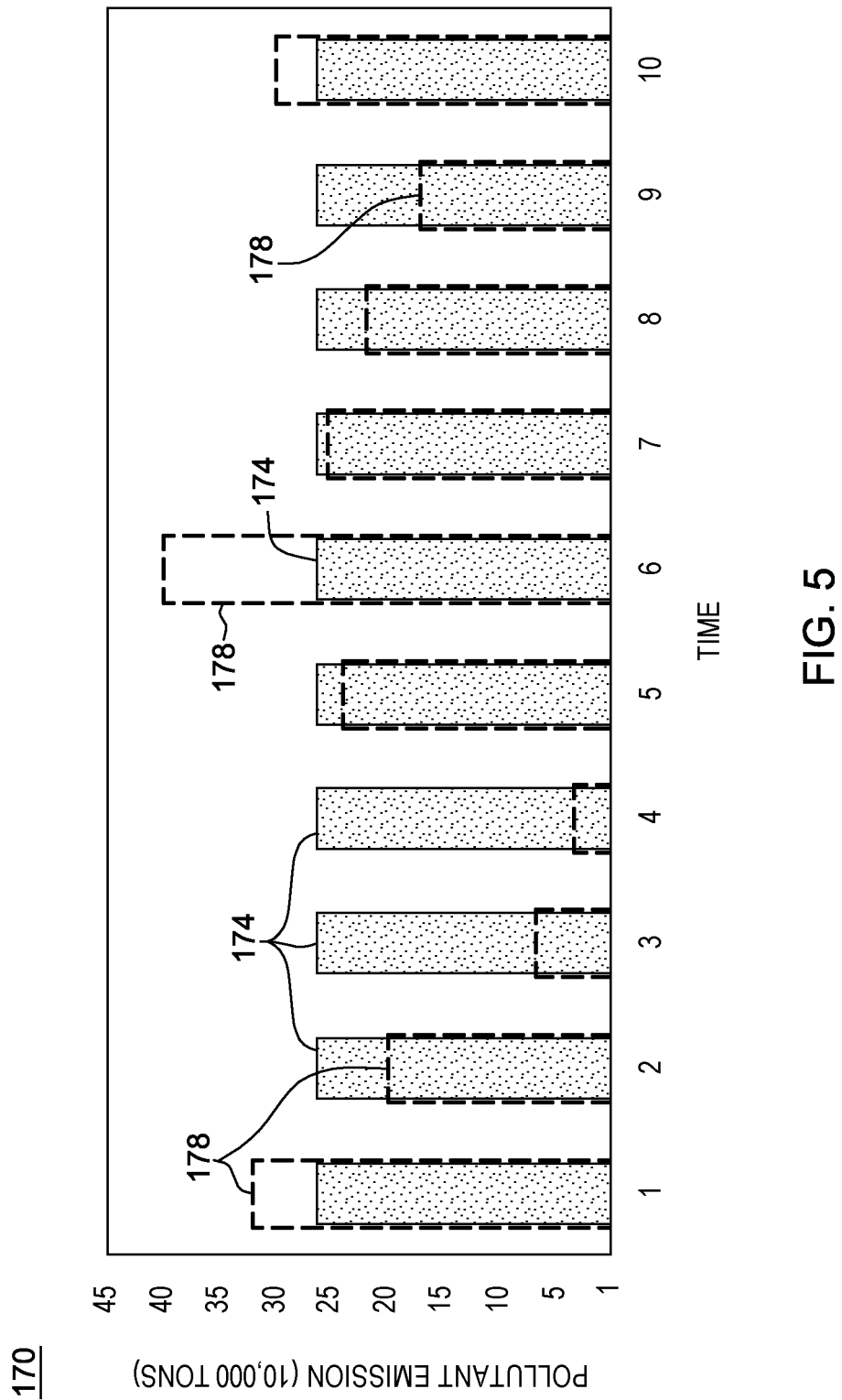
FIG. 5 depicts a graph of example emissions amounts (e.g., true amounts) periodically over a time period as compared to purgeable emission amounts at corresponding time instances in one embodiment.

FIG. 5 depicts a graph of example emissions amounts (e.g., true amounts) periodically over a time period as compared to purgeable emission amounts at corresponding time instances in one embodiment. As shown in FIG. 5, the graph 170 depicts example measured relatively uniform emissions amounts 174 (e.g., true amounts) over a period, particularly at each of multiple unit time periods i, e.g., i=1, 2, ..., 10. Additionally depicted are corresponding purgeable emissions amounts 178 (E) computed at each time period i.

Figure 6:
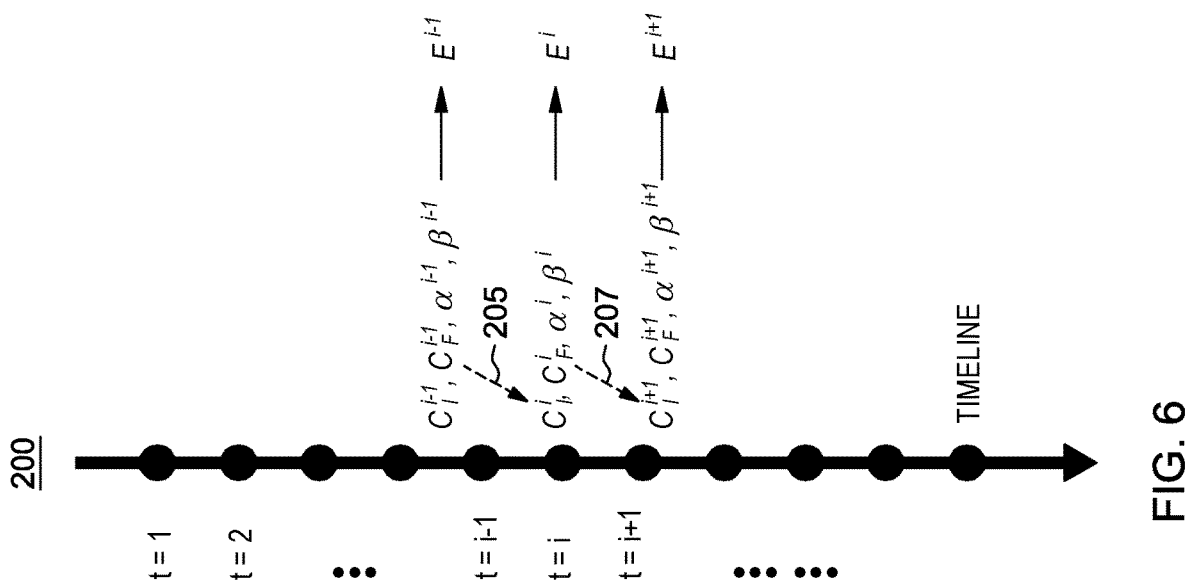
FIG. 6 shows a time line depicting the use of the PESF model and key coefficients to determine the purgeable emissions component $E_t$ at successive times $t=i-1, i, i+1$ in one embodiment.

FIG. 6 shows a time line 200 depicting the use of the PESF model and key coefficients to determine the purgeable emissions component $E_t$ at successive times t=i−1, i, i+1 in one embodiment. In one embodiment, a time period (delta T) between consecutive purgeable emissions discharge component $E_t$ computations is configurable, and may be 1 hour. For example, a 2-day discharge plan may be generated with computations at each hour, e.g., for 48 hours. While periodic computations are shown at successive times t=i−1, i+1, etc., it is not necessary that this be periodic and the purgeable emissions component calculation may occur any time. The time line 200 of FIG. 6 reflects that if the emission is lower than minimum acceptable value for a current moment (time instance), it becomes necessary to correct the emission intensity before (i.e., prior to) this current moment by changing the initial concentration at this time. As shown in the time line 200 of FIG. 6, the initial concentration thus becomes the final concentration of last time.

Thus, as shown in the time line 200 at each consecutive time t=i−1, i and i+1, there is correspondingly computed corresponding purgeable emissions components $E^{i-1}$, $E^i$, and $E^{i+1}$ using equation 4). In the computations of $E^{i-1}$ at time i−1, there is computed the initial concentration $C_I^{i-1}$, a final concentration $C_F^{i-1}$, and coefficients $\alpha^{i-1}$, $\beta^{i-1}$. Similarly, for the computations of $E^i$ at time i, there is computed the initial concentration $C_I^i$, a final concentration $C_F^i$, and coefficients $\alpha^i$, $\beta^i$. As shown at 205 in FIG. 6, the final pollutant concentration $C_F^{i-1}$ of the immediately prior time period i=t−1 is the initialized value concentration value $C_I^i$ for the next current period. Stated alternatively, $C_I|_{t=i} = C_F|_{t=i-1}$. Similarly, for the computations of $E^{i+1}$ at time i+1, there is computed the initial concentration $C_I^{i+1}$, a final concentration $C_F^{i+1}$, and coefficients $\alpha^{i+1}$, $\beta^{i+1}$. It is similarly noted at 207 that the final pollutant concentration of the prior period $C_F^i$ becomes the initialized concentration value $C_I^{i+1}$ of the next period.

Figure 7:
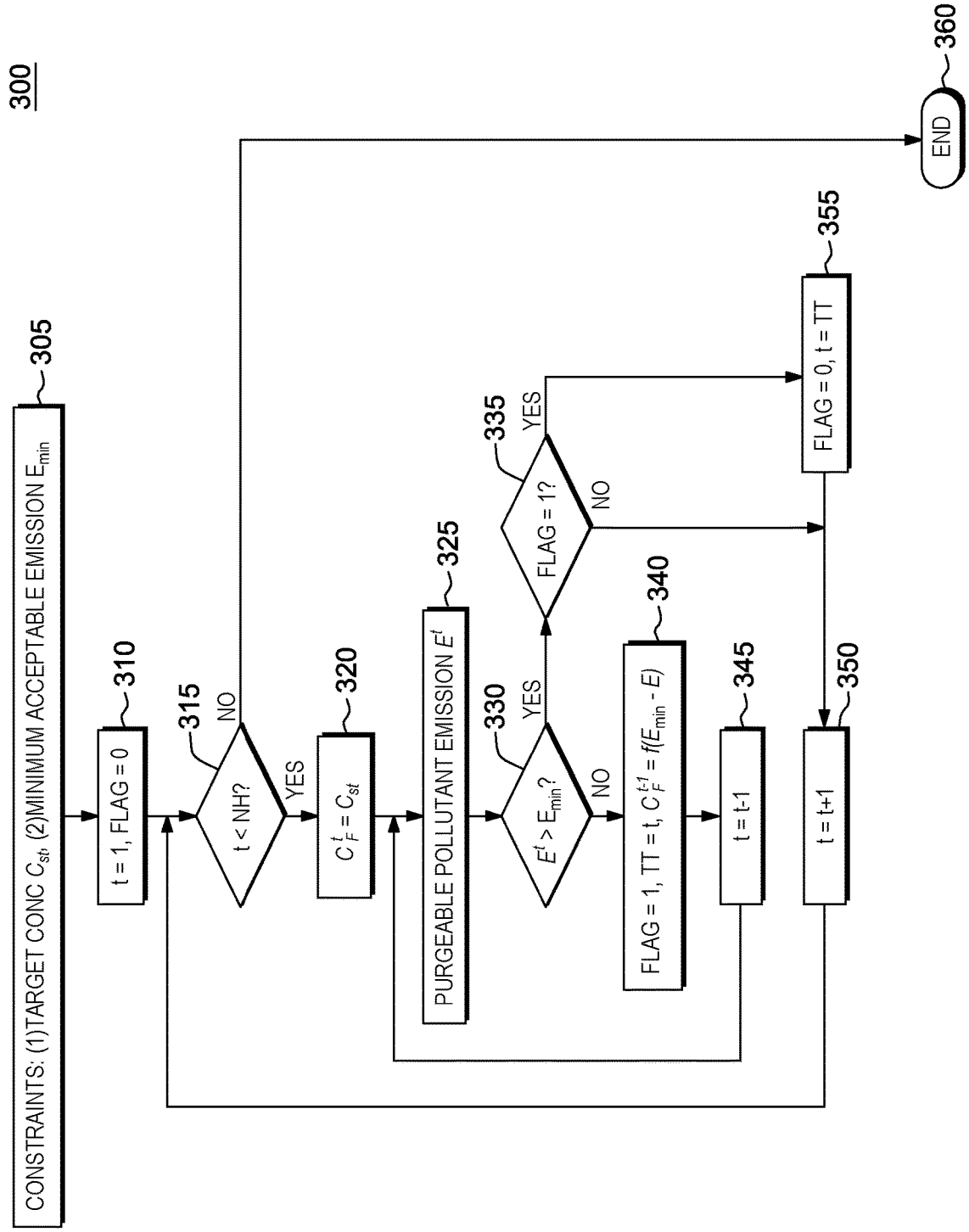
FIG. 7 shows an example method for generating an emission correction scheme according to one or more embodiments of the present invention.

FIG. 7 shows an example method 300 for generating an emission correction scheme according to one or more embodiments of the present invention. As shown, at step 305, a client specifies, through a computer system interface, a target concentration (i.e., a density) of pollutant, and a minimum acceptable emission amount $E_{min}$ (e.g., in tons). In one embodiment, the user-specified target concentration of pollutant is a standard pollutant concentration level $C_{st}$. At step 310, the time is initialized as t=1 and a variable FLAG is initialized to zero (i.e., FLAG=0). A determination is made at 315 whether the current time is less than a maximum time NH, i.e., whether t<NH, where NH is the period for the discharge plan being made, e.g., NH=48 hours in order to make a 2-day discharge plan. If time t is greater than NH, then the method ends at 360. Otherwise, at step 315, if the current time is less than maximum time NH, the process continues to 320 where a final concentration amount at i=t is $C_F^t$ is assigned the value of the customer specified target concentration of pollutant $C_{st}$, i.e., $C_F^t = C_{st}$. Then, at 325, the method computes the purgeable pollutant emission at the time i=t, i.e., compute $E^t$. Continuing to step 330, a determination is then made as to whether the current computed purgeable pollutant emission $E^t$ is greater than the customer specified minimum acceptable emission amount $E_{min}$, whether $E^t > E_{min}$.

If, at step 330, it is determined that the current computed purgeable pollutant emission $E^t$ is greater than the specified minimum acceptable emission amount $E_{min}$, then the process continues to 335, FIG. 7 where a further determination is made as to whether the variable FLAG has been assigned a value of one (i.e., is FLAG=1). If FLAG does not equal 1, i.e., FLAG≠1, then the process proceeds to 350 where the time is incremented to the next value, i.e., t=t+1. Afterwards, the process returns to 315, FIG. 7 where steps 315, 320, 325 and 330 are repeated.

Returning to step 335, it is determined that the variable FLAG has been assigned a value of one (i.e., FLAG=1), then the process proceeds to 355, FIG. 7 where the variable FLAG is re-set to value FLAG=0, and the current time t is updated as time TT which time TT represents the first time emission volume is less than the minimum (i.e., $E < E_{min}$). After assigning the value TT to current time t, the process proceeds to step 350 where the time is incremented to the next value, i.e., t=t+1, and the process returns to 315 where steps 315, 320, 325 and 330 are repeated. Thus, for the FLAG variable: if $E < E_{min}$, FLAG=1, if $E > E_{min}$, FLAG=0.

Returning to step 330, if it determined that the current computed purgeable pollutant emission $E^t$ is not greater than the specified minimum acceptable emission amount $E_{min}$, then the process proceeds to 340 where: the variable FLAG is assigned a value of one, i.e., FLAG=1, and the variable TT is assigned the current time t to indicate that t (=TT) now represents the first time an emission volume is less than the minimum, and additionally, a value $C_F^{t-1}$ is updated with a value equal to $f(E_{min}-E)$.

For example, for the step at time t, the original equilibrium is: $C_F^t = C_I^t + C_E^t + C_P^t$ where $C_F$ is the final pollutant concentration of this time period, e.g., hour (and it should be equal to a target concentration), $C_I$ is initial pollutant concentration of this hour (and it is equal to a final concentration of an immediate prior hour), $C_E$ is pollutant concentration change caused by emission, and $C_P$ is the pollutant concentration change caused by meteorological and chemistry processes in the atmosphere. This continuous equation is established at each time period, e.g., hour. Since E>Emin, so the equilibrium needs to be updated to:
$C_F^t|_{new} = C_I^t|_{new} + C_{E\,min}^t + C_P^t|_{new}$. So the $C_F^{t-1}$ need to be updated to:

$$C_F^{t-1} = C_I^t|_{new}$$
$$= (C_F^t|_{new} - C_F^t) - (C_P^t|_{new} - C_P^t) - (C_{Emin}^t - C_E^t) + C_I^t$$
$$= f(E_{min} - E).$$

Thus, once $C_E$ is calculated, emission volume could be calculated by integration (i.e., the pugeable emission). If emission volume is less than the minimum acceptable emission volume, the emission volume will be forced equal to minimum acceptable emission volume and the $C_I$ needs to decrease to ensure the $C_F \leq$ target concentration. Once $C_I$ changes, the $C_F$ of last hour changes too, thus the equilibrium relationship of last hour needs to be revised, i.e., the emission volume of previous hours should decrease in advance to ensure concentration of this hour meet the target.

Then the process continues to step 345 where the time is decremented to a previous value, i.e., t=t-1. Then, the process returns to step 325 where the purgeable pollutant emission component $E^t$ is again computed and step 330 is repeated.

Thus, in view of FIG. 7 processing, when it can not be ensured that an emission volume at a current time has a pollutant concentration less than a target concentration, emission volume needs to be reduced from previous days. In such cases, the concentration is higher, and a longer lead time may be needed to meet the target concentration.

Figure 8:
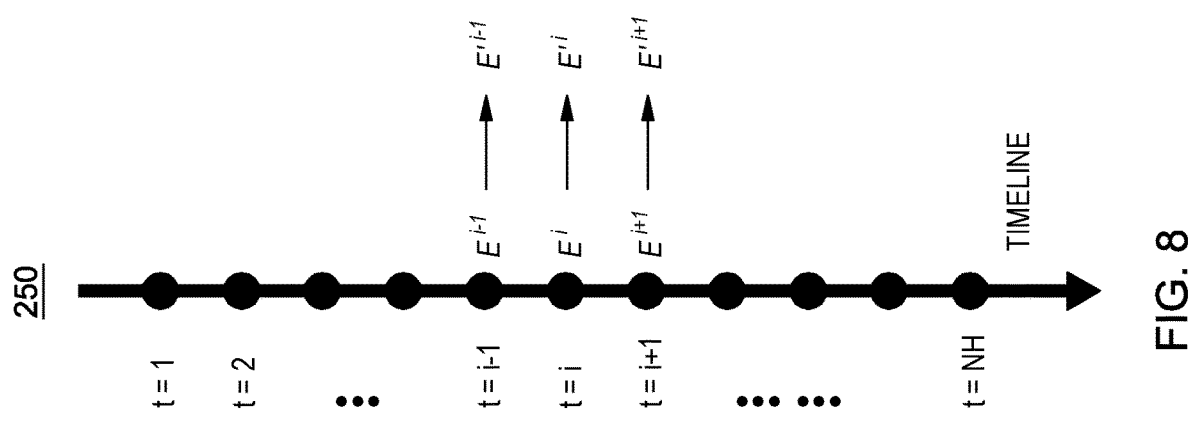
FIG. 8 depicts a further time line corresponding to the timeline of FIG. 6 however representing optimal emissions scheme showing modified purgeable emission components $E^{t\prime}$ computed at the successive times $t=i-1, i, i+1$ in one embodiment.

FIG. 8 depicts a further time line 250 corresponding to the timeline of FIG. 6, however representing optimal emissions scheme showing modified purgeable emission components $E'^t$ computed at the successive times t=i-1, i, i+1 in one embodiment under the constraints specified. Resulting from invoking the method 300 of FIG. 7, there is generated a dynamic emission reduction control shown at example times t=i-1, i, i+1. That is, as shown in the time line 200 at each consecutive time t=i-1, i and i+1, there is correspondingly computed corresponding optimal emissions components $E'^{i-1}$, $E'^i$, and $E'^{i+1}$ using equation 4).

Thus, by computing coefficient α, β and using the pollutant emission scavenging forecasting (PESF) model of equation 3), the method determines the purgeable pollutant emission $E'^t$ which could control pollutant at any target concentration, considering the initial pollutant concentration and pollutant scavenging ability of atmosphere. In order to take the constraint conditions of decision makers into consideration, the dynamic emission correction system of FIG. 7 is used to quickly calculate the optimal emission scheme.

FIG. 9A shows an example case study 400 depicting a line plot of the particulate matter PM2.5 emission concentration 402 emitted by source of the pollutant with no emission control. The pollutant concentration plot 402 reflects the true emission concentration levels emitted by the pollutant source at successive (daily) time instances t=1, 2, ..., 21. Additionally shown is a plot of the computed PM2.5 concentration, i.e., $C_F^t$, with purgeable pollutant emission $E^t$ 405 and computed at the same time instances t=1, 2, ..., 21. As shown the plot 405 of the computed pollutant concentration based on purgeable pollutant emission $E^t$ reflects an example user specified target concentration constraint of 75 ug/m$^3$.

FIG. 9B shows for the example case study 400 of FIG. 9A, a bar graph plotting the example corresponding daily true emission levels 412 (e.g., shown in 10 k tons) emitted by source of the pollutant at the successive (e.g., daily) time instances t=1, 2, ..., 21. As shown, the daily true emission levels are uniform over the time period. Additionally shown are the computed purgeable pollutant emission levels $E^t$ 405 computed at the same time instances t=1, 2, ..., 21. The plot 415 of the computed purgeable pollutant emission $E^t$ reflects a user specified minimum emission level 420 of 50,000 tons.

Figure 9C:
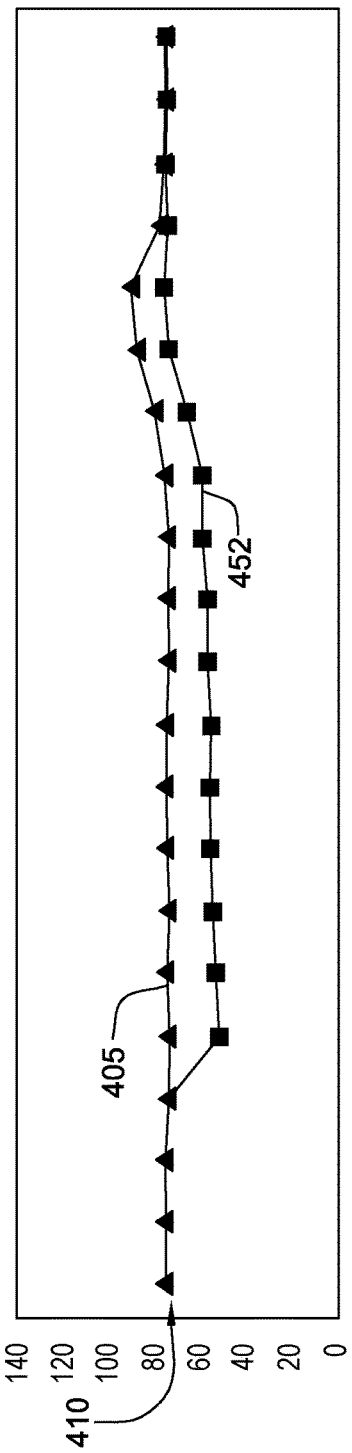
FIG. 9C shows for the example case study of FIG. 9A, a line plot depicting the particulate matter PM2.5 emission concentration emitted using an optimal emission scheme described herein in connection with FIG. 7 as compared with the plot of the computed PM2.5 concentration with purgeable pollutant emission $E^t$.

FIG. 9C shows for the example case study 400 of FIG. 9A, a line plot 450 of the particulate matter PM2.5 emission concentration 452 emitted using a dynamic optimal emission scheme such as described herein in connection with FIG. 7 for computing purgeable emissions $E^{\prime t}$ at the successive time instances. Additionally shown is the plot of the computed PM2.5 concentration, i.e., $C_F{}^t$, with purgeable pollutant emission $E^t$ 405 computed at the same time instances. As shown the plot 455 of the computed purgeable pollutant emission concentration $E^{\prime t}$ reflects an example user specified target concentration constraint of 75 ug/m³.

Figure 9D:
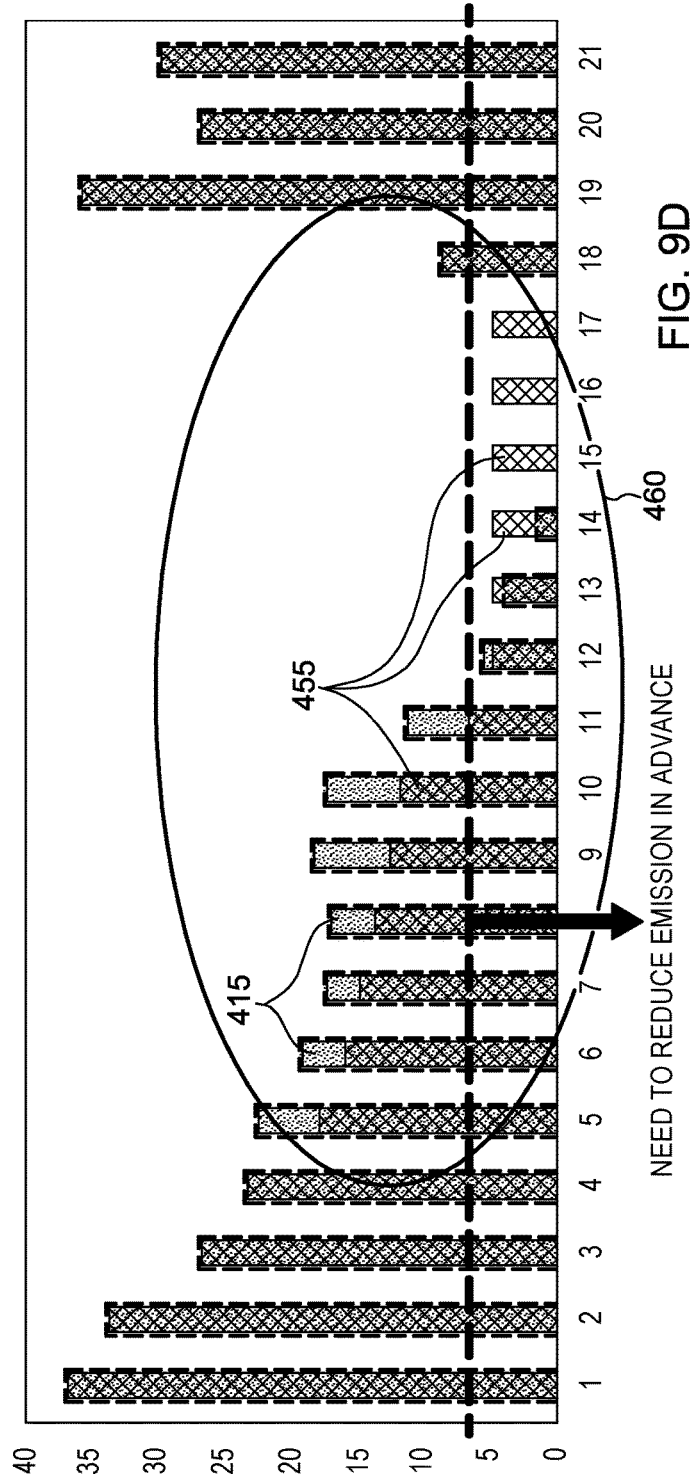
FIG. 9D shows for the example plot of FIG. 9C, a bar graph plotting the optimal emission levels emitted by the source of the pollutant at the successive time instances to achieve the optimal concentration levels as compared with the computed purgeable pollutant emission levels $E^t$ computed at the same time instances.

FIG. 9D shows for the example plot 450 of FIG. 9C, a bar graph plotting the optimal emission levels 455 (e.g., $E^{\prime t}$) emitted by the source of the pollutant at the successive (e.g., daily) time instances t=1, 2, ..., 21 to achieve the optimal concentration levels 452. Further shown are the computed purgeable pollutant emission levels $E^t$ 415 computed at the same time instances t=1, 2, ..., 21. The graph 455 of the future emission volume levels $E^{\prime t}$ in one embodiment, represents the optimal discharge scheme and reflects the user specified minimum emission level, e.g., 50,000 tons and specified target concentration constraint of 75 ug/m³ 410. In one embodiment, the emission volume is calculated based on purgeable emission considering the constraints condition of a particular client or entity. The graphs of FIGS. 9B and 9D reflect a dynamic control strategy 460 based on particular environmental capacity (e.g., below 75 ug/m³). This example discharge scheme makes full use of atmospheric pollutants scavenging ability, so this emission control technique is more optimal than extensive control.

In one embodiment, once a reduce discharge plan is determined, based on the methods of FIG. 7, an entity, e.g., a government of the local area, may decide how to take action, such as, a closing of part of the industry, or restricting cars based on the odd and even number rule, for example.

Figure 1:
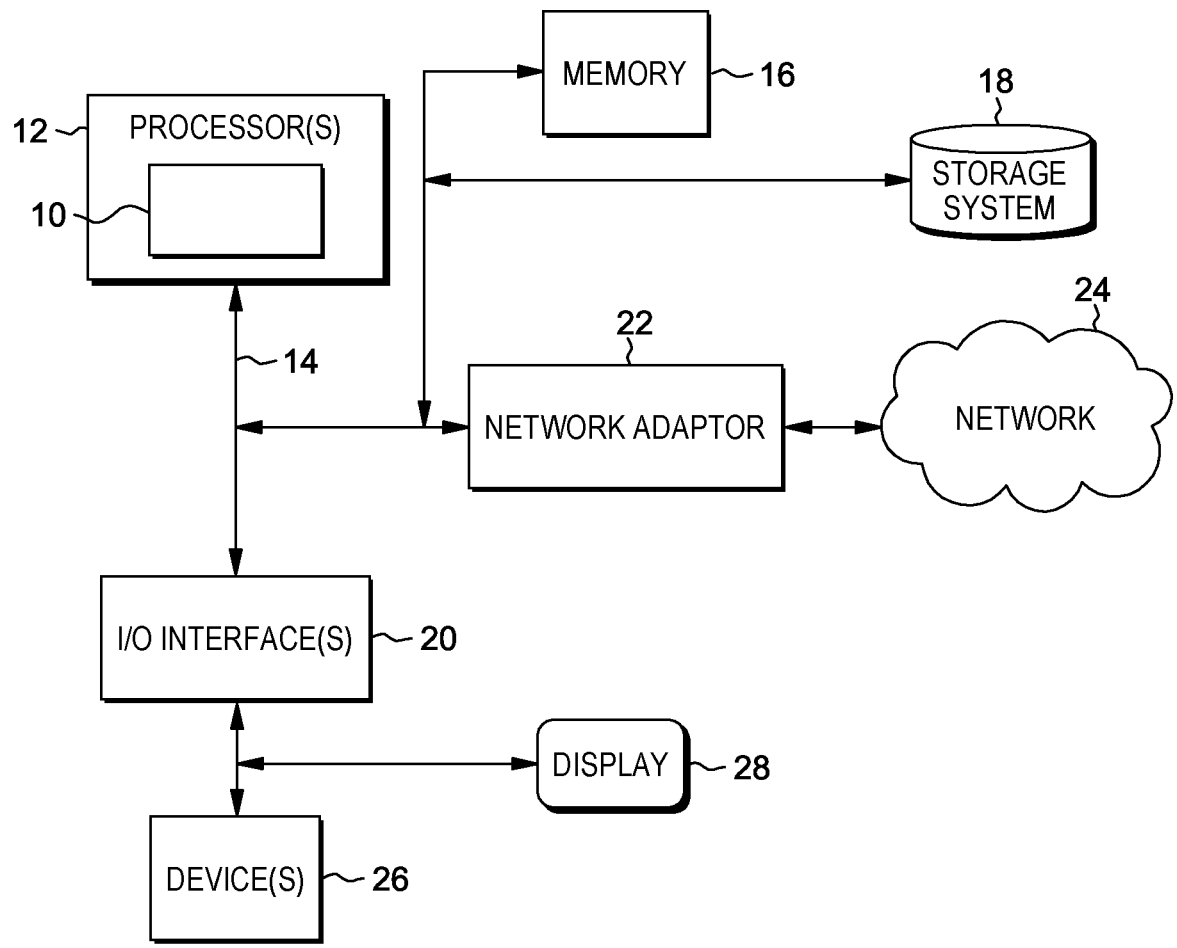
FIG. 1 illustrates an exemplary network in accordance with one or more embodiments of the present invention

FIG. 1 illustrates an exemplary network-connected system in accordance with one or more embodiments of the present invention. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system 12 may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention (see e.g., FIG. 3).

The components of the computer system may include, but are not limited to, one or more processors or processing units 12, a system memory 16, and a bus 14 that operably couples various system components, including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of dynamically controlling emission discharge of pollutants by a pollutant emitting source in a spatial area comprising:
   receiving at a programmed hardware processor, geographic data, atmospheric meteorological data and chemical data pertaining to said spatial area,
   receiving at the programmed hardware processor, emissions data representing pollutant substances emitted by a emitting source;
     generating, by the processor, based on said received meteorological and emissions data, a pollutant scavenging ability factor representing a pollutant comprehensive scavenging ability of the atmosphere, said pollutant scavenging ability factor generated by:
     specifying one or more emissions inventories, each respective emissions inventory specifying a changing emissions amount at said pollutant emitting source and a respective initial concentration of said pollutant; and
     for each emissions inventory:
       simulating, under meteorological and chemical conditions, said emissions inventory, to determine an emissions influencing change of pollutant concentration under said meteorological and chemical conditions from said initial concentration, and
   generating, for said pollutant scavenging ability factor of said emissions inventory, a first coefficient and second coefficient, said first coefficient and second coefficient representing a linear relation between said pollutant scavenging ability factor and said pollutant concentration of the atmosphere in said area under said meteorological and chemical conditions;
   computing, at the processor, a purgeable pollutant emission value over a period of time using said scavenging ability factor, said first coefficient and second coefficient, and a target pollutant concentration of the atmosphere;
   receiving, at said processor, one or more emissions constraint conditions; and
   dynamically controlling emissions at said emitting source based on said computed purgeable pollutant emission value,
   wherein controlled pollutant emissions of said emitting source comply with said received one or more emission constraint conditions.

2. The computer-implemented method of claim 1, wherein said pollutant scavenging ability factor approximately follows a linear relationship with a pollutant concentration of the atmosphere in said area.

3. The computer-implemented method of claim 1, wherein said computing said purgeable pollutant emission value comprises:
   computing a purgeable pollutant emission value of a pollutant as a function of an initial pollutant concentration at each current time instance of successive time instances, a final concentration of said pollutant at an immediate time instance prior to said current time instance, and said first and second coefficients representing said linear relation.

4. The computer-implemented method of claim 3, wherein an initial concentration of said pollutant at a current time instant is equal to a final concentration of said pollutant at the immediate time instance prior to the current time instant.

5. The computer-implemented method of claim 3, further comprising:
   receiving one user-specified meteorological constraint condition comprising a standard pollutant concentration level, and a user-specified chemical constraint condition comprising a minimum emissions requirement.

6. The computer-implemented method of claim 5, wherein said dynamically controlling emissions at said pollutant emitter source based on said purgeable pollutant emission value over said time period comprises:
   calculating, at each current time instance of said successive time instances, a computed purgeable pollutant emission value based on said standard pollutant concentration level at each time instance;
   determining at each said current time instance, whether a computed purgeable pollutant emission value is lower than said minimum emissions requirement; and
   for a current time instance having a computed purgeable pollutant emission value lower than said minimum emissions requirement, correcting an emission intensity of said pollutant emitting source.

* * * * *